United States Patent
Xu et al.

(10) Patent No.: US 12,197,814 B2
(45) Date of Patent: Jan. 14, 2025

(54) METHOD, DEVICE AND MEDIUM FOR PROVIDING INFORMATION SERVICE BASED ON USAGE SCENARIO

(71) Applicant: PATEO CONNECT+ TECHNOLOGY (SHANGHAI) CORPORATION, Shanghai (CN)

(72) Inventors: Tingting Xu, Shanghai (CN); Zhenkai Ying, Shanghai (CN)

(73) Assignee: PATEO CONNECT+ TECHNOLOGY (SHANGHAI) CORPORATION, Shanghai (CN)

( * ) Notice: Subject to any disclaimer, the term of this patent is extended or adjusted under 35 U.S.C. 154(b) by 0 days.

(21) Appl. No.: 17/773,275

(22) PCT Filed: Dec. 9, 2019

(86) PCT No.: PCT/CN2019/124071
§ 371 (c)(1),
(2) Date: Apr. 29, 2022

(87) PCT Pub. No.: WO2021/082192
PCT Pub. Date: May 6, 2021

(65) Prior Publication Data
US 2024/0152318 A1    May 9, 2024

(30) Foreign Application Priority Data
Oct. 30, 2019    (CN) .......................... 201911044735.3

(51) Int. Cl.
*G06F 3/16*    (2006.01)
*G01C 21/36*    (2006.01)
(Continued)

(52) U.S. Cl.
CPC ......... *G06F 3/167* (2013.01); *G01C 21/3608* (2013.01); *G01C 21/362* (2013.01);
(Continued)

(58) Field of Classification Search
CPC ...... G06F 3/167; G06F 11/3438; H04W 4/80; H04W 4/48; H04W 4/024; H04W 4/021;
(Continued)

(56) References Cited

U.S. PATENT DOCUMENTS

2014/0365068 A1    12/2014  Burns et al.
2017/0292852 A1*   10/2017  Kojima .............. G01C 21/3608
(Continued)

FOREIGN PATENT DOCUMENTS

| CN | 105187484 | 12/2015 |
| CN | 105282251 | 1/2016 |

(Continued)

OTHER PUBLICATIONS

Chinese International Search Report for Application No. PCT/CN2019/124071, mailed Jul. 29, 2020 (6 pages).
(Continued)

*Primary Examiner* — Yogeshkumar Patel
(74) *Attorney, Agent, or Firm* — NIXON PEABODY LLP; Jeffrey L. Costellia (57) ABSTRACT

The method for providing an information service includes: determining a usage scenario of a user, by a server, in response to detecting that a mobile device associated with a vehicle is operated by a first action; determining a first interface set associated with the usage scenario, based on the usage scenario of the user, wherein the first interface set includes one or more first interfaces, the first interface is configured for indicating a first function associated with the usage scenario, and the first interface supports a first operation associated with a first voice; and sending the first interface in the first interface set and the first voice associated with the sent first interface to the mobile device, to provide an information service to the user via the first interface and the first voice presented at the mobile device.

20 Claims, 4 Drawing Sheets

(51) Int. Cl.
  *G06F 11/34*   (2006.01)
  *G07C 5/00*    (2006.01)
  *G10L 15/22*   (2006.01)
  *H04W 4/024*   (2018.01)

(52) U.S. Cl.
  CPC .......... *G06F 11/3438* (2013.01); *G07C 5/008* (2013.01); *G10L 15/22* (2013.01); *H04W 4/024* (2018.02); *G10L 2015/223* (2013.01)

(58) Field of Classification Search
  CPC .... H04W 4/025; H04W 4/44; G01C 21/3608; G01C 21/362; G01C 21/3679; G01C 21/3626; G01C 21/3605; G07C 5/008; G10L 15/22; G10L 2015/223; G06Q 20/3224; G06Q 20/20; G06Q 30/0261; G06Q 30/0269
  See application file for complete search history.

(56) References Cited

U.S. PATENT DOCUMENTS

2018/0032997 A1* 2/2018 Gordon .............. G06Q 30/0269
2019/0285430 A1* 9/2019 Sasaki ................ G01C 21/3664

FOREIGN PATENT DOCUMENTS

| CN | 107045797 | 8/2017 |
| CN | 110325409 | 10/2019 |
| CN | 110389800 | 10/2019 |

OTHER PUBLICATIONS

Chinese Office Action for Application No. 201911044735.3, mailed Dec. 10, 2021 (6 pages).
Extended European Search Report for Application No. 19950569.4 mailed Sep. 22, 2023, (9 pages).

* cited by examiner

METHOD, DEVICE AND MEDIUM FOR PROVIDING INFORMATION SERVICE BASED ON USAGE SCENARIO

TECHNICAL FIELD

The embodiments of the present disclosure generally relate to the field of providing information services, and particularly relate to a method, a device and a computer storage medium for providing an information service based on a usage scenario.

BACKGROUND

At present, mobile devices such as smart phones have become indispensable tools. With the development of technology, these mobile devices are constantly endowed with new functions to improve people's lives. For example, in the field of IoV (Internet of Vehicles), users may use mobile devices as smart keys of vehicles to perform various operations and management on the vehicles, and may also use mobile devices to provide users with various information services. Moreover, with the rapid development of artificial intelligence, more and more mobile devices support an artificial intelligence voice technology. Therefore, there is an increasing demand for providing information services through artificial intelligence voice in combination with the smart keys of the vehicles.

In the traditional solution of providing information services, the mobile devices used as the smart keys of the vehicles can only be used to send interactive operation commands related to vehicle control, but cannot carry out intelligent voice data interaction. In addition, the provided information is limited and the interaction efficiency is low.

SUMMARY

The embodiments of the present disclosure provide a method, a device and a computer storage medium for providing an information service based on a usage scenario, which can realize intelligent voice data interaction, and improve the information interaction efficiency.

According to a first aspect of the present disclosure, a method for providing an information service based on a usage scenario is provided. The method includes: at a server, in response to detecting that a mobile device associated with a vehicle is operated by a first action, determining a usage scenario of a user; based on the usage scenario of the user, determining a first interface set associated with the usage scenario, wherein the first interface set includes one or more first interfaces, the first interface is configured for indicating a first function associated with the usage scenario, and the first interface supports a first operation associated with a first voice; and sending the first interface in the first interface set and the first voice associated with the sent first interface to the mobile device, so as to provide an information service to the user via the first interface and the first voice presented at the mobile device.

According to a second aspect of the present disclosure, a device for providing an information service based on a usage scenario is provided. The device includes at least one processing unit and at least one memory. The at least one memory is coupled to the at least one processing unit and stores an instruction to be executed by the at least one processing unit. The instruction, when executed by the at least one processing unit, enables the device to execute actions. The actions include: at a server, in response to detecting that a mobile device associated with a vehicle is operated by a first action, determining a usage scenario of a user; based on the usage scenario of the user, determining a first interface set associated with the usage scenario, wherein the first interface set includes one or more first interfaces, the first interface is configured for indicating a first function associated with the usage scenario, and the first interface supports a first operation associated with a first voice; and sending the first interface in the first interface set and the first voice associated with the sent first interface to the mobile device, so as to provide an information service to the user via the first interface and the first voice presented at the mobile device.

According to a third aspect of the present disclosure, a computer-readable storage medium is provided. The computer-readable storage medium stores a computer program, and the computer program, when executed by a machine, enables the machine to implement any step of the method according to the first aspect of the present disclosure.

The summary part is provided to introduce the selection of concepts in a simplified form, which will be further described in the following detailed description. The summary part is not intended to identify key features or essential features of the present disclosure, and is also not intended to limit the scope of the present disclosure.

BRIEF DESCRIPTION OF THE DRAWINGS

Through the more detailed description of the embodiments of the present disclosure in conjunction with the drawings, the above and other objectives, features, and advantages of the present disclosure will become more apparent. In the embodiments of the present disclosure, the same reference numerals generally represent the same components.

DETAILED DESCRIPTION

The preferred embodiments of the present disclosure will be described in further detail hereinafter with reference to the drawings. Although the preferred embodiments of the present disclosure are shown in the drawings, it should be understood that the present disclosure may be embodied in various forms and should not be construed as limited to the embodiments set forth herein. On the contrary, these embodiments are provided to make the present disclosure more thorough and complete, and to fully convey the scope of the present disclosure to those skilled in the art.

The term "including" and similar terms thereof used herein represents open inclusion, which means, "including but not limited to". Unless specifically stated, the term or represents "and/or". The term "based on" represents "at least partially based on". The term "one exemplary embodiments" or "one embodiment" represent "at least one exemplary embodiment". The term "another embodiment" represents at least one other embodiment. The terms "first", "second", or the like, may refer to different or identical objects. Other explicit and implicit definitions may be probably included below.

As discussed above, the traditional solution of providing the information service on the mobile device used as the smart key of the vehicle only supports simple instruction data interaction, but cannot support intelligent voice interaction, and is difficult to get information interaction related to different usage scenarios quickly or efficiently.

To at least partially solve one or more of the above problems and other potential problems, the exemplary embodiments of the present disclosure propose a solution for providing an information service based on a usage scenario. In this solution, firstly, at a server, in response to detecting that a mobile device associated with a vehicle is operated by a first action, a usage scenario of a user is determined; subsequently, based on the usage scenario of the user, a first interface set associated with the usage scenario is determined, wherein the first interface set includes one or more first interfaces, the first interface is configured for indicating a first function associated with the usage scenario, and the first interface supports a first operation associated with a first voice; and finally, the first interface in the first interface set and the first voice associated with the sent first interface are sent to the mobile, so as to provide an information service to the user via the first interface and the first voice presented at the mobile device.

In this way, by determining the usage scenario when the mobile device is operated with a predetermined action, determining the associated first interface set based on the determined usage scenario, and enabling the first interface included in the first interface set to support the first operation associated with the first voice, the present disclosure is enabled to push the information service based on the usage scenario, and realize the intelligent voice data interaction, thus obviously improving the information interaction efficiency.

The basic principles and a plurality of example implementations of the present disclosure are explained below with reference to the drawings.

Figure 1:
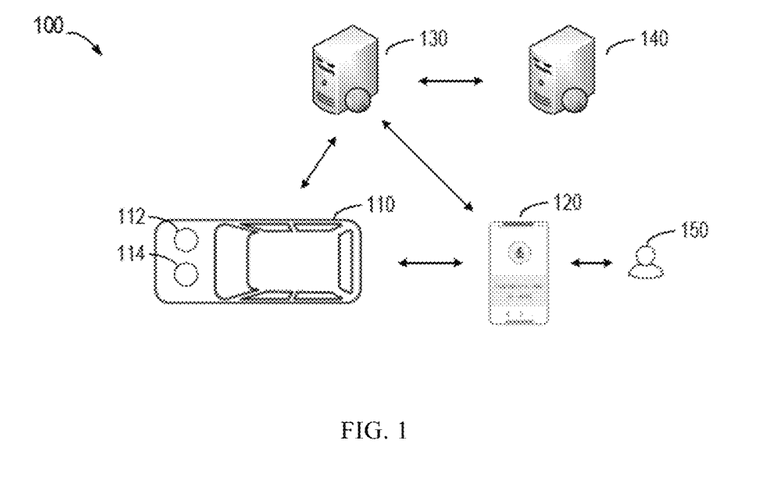
FIG. 1 illustrates a schematic diagram of an information service environment 100 for implementing various implementations of the present disclosure.

FIG. 1 illustrates a schematic diagram of an information service environment 100 capable of implementing various implementations of the present disclosure. It should be understood that the information service environment 100 shown in FIG. 1 is only exemplary, and should not constitute any limitation on the realized function and scope described in the present disclosure. As shown in FIG. 1, the information service environment 100 includes a vehicle 110, a mobile device 120 of a user 150, a server 130, a third-party application server 140 and the user 150. In FIG. 1, the vehicle 110 is provided with an on-board device 112 and a sensor group 114, wherein the mobile device 120, the server 130 and the on-board device 112 in the vehicle 110 can perform data interaction.

In some embodiments, the vehicle 110 may be a carrier or a transport means such as a motor vehicle, a non-motor vehicle, or the like. The on-board device 112 on the vehicle 110 may wirelessly receive a command from the external mobile device 120 and perform a corresponding action according to the command. The on-board device 112 is, for example, a vehicle control system, which may include a bluetooth module to realize bluetooth pairing, connection authentication services, and the like. The vehicle control system may also provide, for example, vehicle control services (for example, controlling a door and a window of the vehicle) based on a bluetooth channel. The sensor group 114 on the vehicle 110 may be distributed at different locations of the vehicle 110 for collecting a status of the vehicle 110 and a status of a surrounding environment of the vehicle 110. For example, the status of the vehicle may include a fuel capacity status of the vehicle 110, a power status of a power battery of the vehicle 110, a safety status of the vehicle 110, a maintenance status of the vehicle 110, an insurance status of the vehicle 110, a location status of the vehicle 110, and an external environment status of the vehicle 110. In some embodiments, the on-board device 112 may send information associated with the collected status of the vehicle to the mobile device 120 and/or the server 130. In some embodiments, when the status of the vehicle exceeds a status threshold, the on-board device 112 may send the information associated with the status of the vehicle to the mobile device 120 and/or the server 130. For example, when the fuel capacity of the vehicle 110 exceeds a fuel capacity threshold (e.g., the fuel capacity is lower than 20%), the on-board device 112 may send information associated with a low fuel capacity to the mobile device 120 and/or the server 130.

In some embodiments, the user 150 may request an information service from the server 130 through the mobile device 120. Examples of the information service include, but are not limited to, information services associated with vehicles such as vehicle condition inquiry, refueling/charging, vehicle cleaning, maintenance, designated driver, vehicle rental, airport parking, traffic violations inquiry and/or payment; ticket booking payment (air ticket/train ticket/movie ticket/scenic spot ticket), restaurant search and/or reservation, take-out search and/or reservation, hotel search and/or reservation, scenic spot and/or strategy search, or the like. Here, the mobile device 120 is configured to realize a function of a virtual key of the vehicle 110. The virtual key is usually a software program installed in the mobile device, and can communicate with a vehicle control system remotely or in short range through various communication technologies. The communication technology is, for example, but not limited to Bluetooth, NFC (Near Field Communication), and the like. Specifically, in the virtual key application, the server 130 may send different display interfaces to the mobile device 120 based on the usage scenario of the user 150, wherein each display interface indicates a function associated with the usage scenario. Examples of the usage scenario of the user 150 include, but are not limited to, near field, exiting the vehicle, remote, traveling, etc. Examples of the display interface include, but are not limited to, a display interface with a designated driver icon in the near-field scenario, a display interface with a locking icon and a display interface with a refueling icon in the scenario of exiting the vehicle, and a display interface with a hitchhiking icon and a display interface with a wading icon in the remote scenario. In some embodiments, the user 150 may operate the mobile device 120 running the virtual key with a predetermined action to request an information service from the server 130.

In some embodiments, the server 130 may also actively provide an information service to the user 150 based on the information associated with the status of the vehicle and received from the on-board device 112. For example, when the fuel capacity of the vehicle 110 is lower than the fuel capacity threshold (for example, the fuel capacity is lower than 20%), the server 130 may provide a display interface with a refueling icon and a voice "do you need to refuel?" to the mobile device 120. In some embodiments, the server 130 may also actively provide an information service to the user 150 based on the advertising information associated with the information service and received from the third-party application server 140. For example, when the server 130 receives discount information of a restaurant, providing a mobile device 120 with a display interface with an ordering icon and a voice "do you need to order a meal?" to the mobile device 120.

In some embodiments, the server 130 may, in response to a voice response of the user 150 to a played voice, perform an operation supported by voice and/or an operation associated with another function. For example, the server 130 may recognize the voice response to generate one or more keywords, and these keywords are associated with at least one of a plurality of operations. For example, the user responds "Needing a designated driver service" to "do you need a designated driver service?", then the server 130 searches a designated driver service. If the user responds "please refuel the vehicle" to "do you need a designated driver service?", the server 130 searches a surrounding gas station. The server 130, based on an execution result of the operation, generates an interface indicating the execution result and a voice associated with the interface. For example, the server 130, based on a search result of the designated driver service, generates an interface with the search result (for example, a list of surrounding designated driver services), and a voice "do you want to select the first driving service?". In some embodiments, the server 130 may also provide an interface to interact with the third-party application server 140, thereby calling the third-party application server 140 to provide an information service to the user 150.

In some embodiments, the mobile device 120 may also receive one or more display interfaces associated with the current usage scenario of the user 150 and voices thereof from the server 130, and present one of the one or more display interfaces to the user 150, and play the voice associated with the presented display interface at the same time. For example, a display interface with a key icon is displayed on a display of the mobile device 120 and a voice "do you need to open the door?" is played at the same time, or the display interface with the designated driver icon is displayed and the voice ""do you need a designated driver service?" is played at the same time. In some embodiments, the mobile device 120 may include, but is not limited to, any device with computing capabilities such as a personal computer, a desktop computer, a laptop computer, a tablet computer, a smart phone, a wearable device, and a personal digital assistant.

In this way, the user 150 can intelligently push the information service based on the usage scenario on the mobile device 120 used as the smart key of the vehicle, and can provide the information service through intelligent voice interaction. Therefore, the information service providing efficiency and the user experience are improved.

Figure 2:
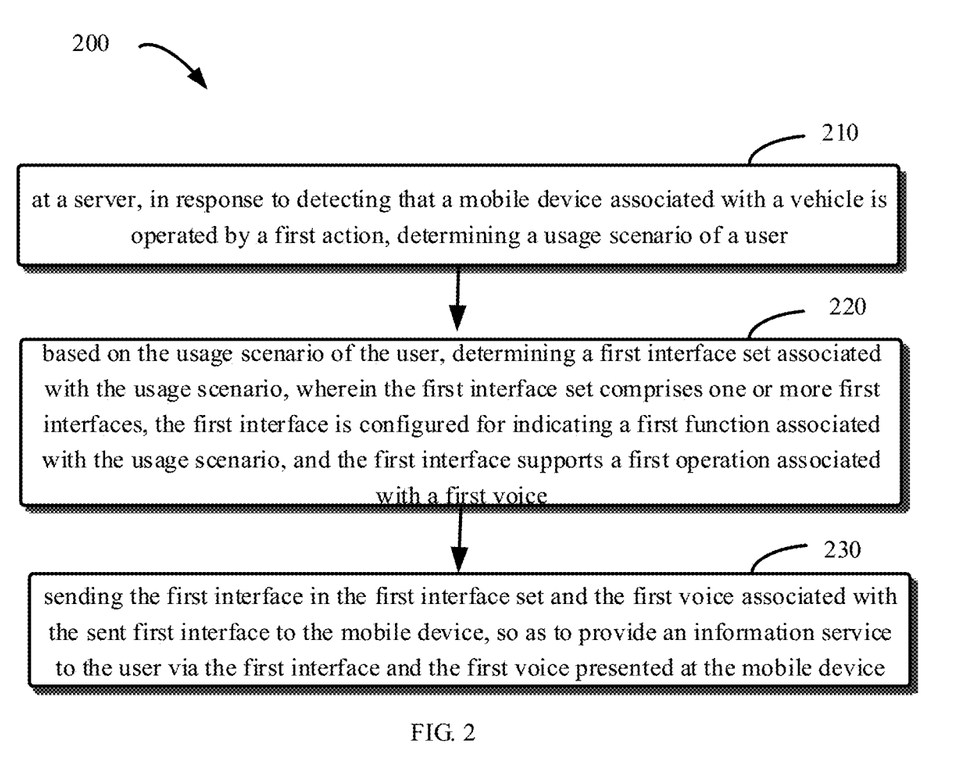
FIG. 2 illustrates a flow chart of a method 200 for providing an information service based on a usage scenario according to an embodiment of the present disclosure.

FIG. 2 illustrates a flow chart of a method 200 for providing an information service based on a usage scenario according to an embodiment of the present disclosure. For example, the method 200 may be performed by a server 130 as shown in FIG. 2. It should be understood that the method 200 may further include additional steps which are not shown and/or the illustrated steps may be omitted, and the scope of the present disclosure is not limited in this respect.

At 210, at the server 130, in response to detecting that a mobile device 120 associated with a vehicle 110 is operated by a first action, a usage scenario of a user 150 is determined. In some embodiments, the predetermined action may be a physical movement (e.g., shaking) made to the mobile device 120. For example, when the user 150 approaches the vehicle 110 with the mobile device 120 that opens a virtual key application, in response to the shaking operation executed by the user 150 on the mobile device 120, the application on the mobile device 120 will monitor the shaking event and call a server interface through the event, so that the server 130 can detect the event. In some embodiments, the predetermined action may also be other forms of interaction with the mobile device 120, such as inputting a voice instruction to the mobile device 120, executing a gesture operation over a display interface, and the like. The user 150 may be in a plurality of usage scenarios, and each usage scenario may have a plurality of functions. For example, a near field scenario may include functions such as driving, temperature controlling, and seat controlling; a scenario of exiting the vehicle may include functions such as vehicle locking, and providing of a refueling service, and the like; a travel scenario may include functions such as providing of a hitchhiking service and providing of a designated driver service, and the like. Some functions may also include a variety of operations (i.e., skills). For example, the hitchhiking service may include operations such as order taking, paying, and order dispatching.

In some embodiments, in response to detecting that the mobile device 120 associated with the vehicle 110 is operated by a first action, the server 130 may acquire location information of the user 150 from the mobile device 120 and determine a current usage scenario of the user 150 at least based on the location information and a behavior habit of the user 150. The mobile device 120 may detect the location information of the user 150, and examples of the location information include but are not limited to, a current location of the user 150, a location relationship between the mobile device 120 and an on-board device 112, and the like. A GPS on the mobile device 150 can provide a current location of the mobile device, and information connection between the mobile device 120 and the on-board device 112 can provide the location relationship between the mobile device 120 and the on-board device 112. For example, when a current distance between the mobile device 120 and the on-board device 112 is within 50 meters, from a long distance to a short distance from the vehicle, it is determined that the usage scenario of the user 150 is near field. When the current distance between the mobile device 120 and the on-board device 112 is within 50 meters, from a short distance to a long distance from the vehicle, it is determined that the usage scenario of the user 150 is exiting the vehicle. When the current distance between the mobile device 120 and the on-board device 112 is outside 50 meters, it is judged that the usage scenario of the user 150 is remote. In some embodiments, the server 130 may also determine the behavior habit of the user 150 at least based on historical behavior data of the user 150. For example, when the user 150 is at home between 7:00 and 8:00 in the morning of a working day, it is judged that the user 150 needs to go to work at present, that is, the usage scenario of the user 150 is traveling. Only the usage scenarios and some examples of determining the usage scenarios are listed above. However, the usage scenarios and the manner of determining the usage scenarios are not limited to this.

At block 220, based on the usage scenario of the user 150, an interface set (hereinafter referred to as a first interface set for convenience of description) associated with the usage scenario is determined, wherein the first interface set includes one or more first interfaces, the first interface is configured for indicating a function associated with the usage scenario (hereinafter referred to as a first function for convenience of description), and the first interfaces support an operation (hereinafter referred to as a first operation for convenience of description) associated with a voice (hereinafter referred to as a first voice for convenience of description). As described above, in each usage scenario, there are a plurality of functions (i.e., functions intended to be used by the user). In some embodiments, the server 130 may pre-store an interface set associated with the usage scenario. The interface set includes a plurality of interfaces, and each interface indicates a function associated with the usage scenario. After determining the usage scenario of the user 150, the server 130 may determine the first interface set (i.e., the function that may be used in the scenario) associated with the usage scenario based on the usage scenario of the user 150. For example, in a case of a near-field scenario, a display interface with a key icon and a display interface with a designated driver icon, and the like, may be determined. In a case of a scenario of exiting the vehicle, a display interface with a locking icon and a display interface with a refueling icon, and the like, may be determined. In a case of a remote scenario, a display interface with a hitchhiking icon and a display interface with a wading icon, and the like, may be determined.

In some embodiments, the server 130 can implement a plurality of skills (i.e., operations) related to the function on each interface. For example, the display interface with the hitchhiking icon can realize the skills of order taking, paying and order dispatching related to hitchhiking. In addition, an intelligent voice platform is implemented on the server 130, and a voice skill associated with each skill is realized on the voice platform, thereby forming an intention library of each skill. The voice skill particularly refers to a skill or a service provided by voice. For example, "checking the weather" is a voice skill, and "listening to music" is also a skill, wherein each intention library is corresponding to a display interface that realizes this skill. Voice broadcast of the display interface, guide of the voice broadcast, and semantics understanding in this scenario can be solved in the intention library. For example, for each function in each usage scenario, the voice platform may preset some skills in advance, i.e., what words the user 150 says correspond to what entries, or what words the user 150 may say and what services may bring in this scenario can be trained according to understanding of NLU. Therefore, the server 130 can determine voices associated with each interface in the interface set after determining the interface set associated with the usage scenario. For example, when the display interface with the hitchhiking icon is determined, it can be determined that the voice is "Take the order?". When the display interface with the key icon is determined, it can be determined that the voice is "open the door?". It should be understood that the voice technology known in the art may be adopted to publish the voice skills and the intention library, which will not be described in detail here. In this way, the server 130 can determine the functions that the user 150 can use in this scenario based on the usage scenario of the user 150, thereby determining the interfaces indicating these functions and the voices associated with these interfaces.

At block 230, the sever 130 may send the first interface in the first interface set and the first voice associated with the sent first interface to the mobile device 120, so as to provide an information service to the user 150 via the first interface and the first voice presented at the mobile device 120. After determining the first interface and the first voice of the user 150 in the current usage scenario, the server 130 can find out a possible intention of the user 150 according to the user behavior of the user 150 and the vehicle, i.e., a function that the user 150 may use in the usage scenario. As described above, in each usage scenario, there are a plurality of functions, and the user 150 may possibly use several of the plurality of functions. For example, in the travel scenario, since the user 150 has registered a hitchhiking owner before, the server 130 may determine that the user 150 may use the hitchhiking function in the scenario, i.e., determine the display interface with the hitchhiking icon, and the display interface may also show that there are many people nearby, and a voice "there are 3 people nearby who have sent orders, do you want to take orders?". The server 130 may send the display interface with the hitchhiking icon and the voice associated with the display interface to the mobile device 120.

In some embodiments, the server 130 may send a plurality of first interfaces to the mobile device 120 at the same time to provide a plurality of choices for the user 150. In this case, the mobile device 120 may display a plurality of first interfaces through a plurality of floating screens in a locked state, switch between the plurality of interfaces sent in response to a slide operation of the user 150 on the display of the mobile device 120, and simultaneously play a voice associated with the displayed interfaces. In some example embodiments, the server 130 may, at least based on the behavior habit of the user 150, determine a priority of the first interface in the first interface set, wherein the behavior habit is determined at least based on the historical behavior data of the user 150. For example, the server 130 may collect behavior data of the user 150 in the recent period, and determine the behavior habit of the user 150 in the current usage scenario according to the behavior data. For example, a number of times that the user 150 uses a certain function in the usage scenario within a predetermined time may be counted, and the priority of the interface is determined according to the number of times. The priority of the interface used for the most times is the highest. It should be understood that the technology known in the art may be adopted to determine the priority of the first interface in the first interface set based on the behavior habit of the user 150, which will not be described in detail here. Then, the server 130 may, based on the priority, send a predetermined number of first interfaces in the first interface set and first voices associated with the first interfaces to the mobile device 120. In this way, the server 130 may give priority to the function that the user 150 is most likely to use, so that the user 150 can quickly obtain a desired information service through simple operation, thus improving the user experience.

In some embodiments, the server 130 may also, in response to the received information associated with the information service, determine an interface (hereinafter referred to as a third interface for convenience of description) and a voice (hereinafter referred to as a third voice for convenience of description) associated with the third interface, wherein the third interface is configured for indicating a third function associated with the information service, and the third interface indicates an operation (hereinafter referred to as a fourth operation) associated with the third function. In some embodiments, the information associated with the information service may include at least one of the following: information associated with a status of the vehicle; and advertising information actively pushed by a third-party application server. In some embodiments, the server 130 may, in response to receiving the information associated with the status of the vehicle from the on-board device 112, determine the third interface and the third voice. In some embodiments, when the status of the vehicle exceeds a status threshold, the on-board device 112 may send the information associated with the status of the vehicle to the server 130. For example, the server 130 may acquire from the on-board device 112 that a fuel capacity of the vehicle 110 is lower than a fuel capacity threshold (for example, the fuel capacity is lower than 20%), then a display interface providing a refueling service and a voice "do you need to refuel?" are determined. In some embodiments, the server 130 may also, in response to receiving the actively pushed advertising information from the third-party application server 140, determine the third interface and the third voice. In some embodiments, the server 130 is implemented with an interface for interacting with a plurality of third-party application servers 140, so that the plurality of third-party application servers 140 can actively push the advertising information to the server 130. For example, when receiving discount information of a restaurant, the server 130 may determine a display interface providing a meal ordering service and a voice "do you need to order a meal?". In this way, the server 130 may implant life & vehicle services and actively provide different information services to the users 150.

Based on the information service providing methods above, the embodiments of the present disclosure can actively push the information service to the user through an intelligent voice based on the usage scenario of the user with an intelligent key as an entry point, thereby simplifying the operation of the user. In addition, by integrating various ecological services, the embodiments of the present disclosure can provide the user with various types of information services, thus improving user experience.

Figure 3:
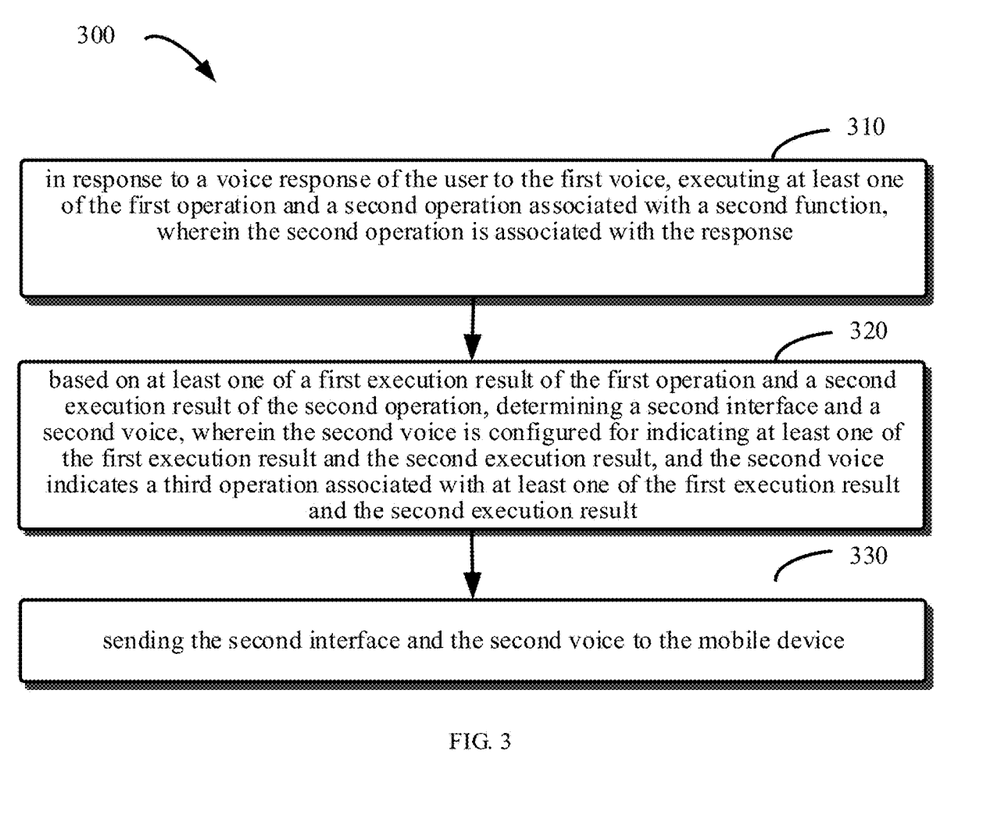
FIG. 3 illustrates a flow chart of a method 300 for providing an information service based on a usage scenario according to an embodiment of the present disclosure.

In some embodiments, after the first interface in the first interface set and the first voice associated with the sent first interface are sent to the mobile device 120, the server 130 may also execute further operations with respect to the voice response of the user 150 to the first voice. The operations of executing one round of operations and determining the interface and voice for the voice response of the user to the first voice are described in detail below with reference to FIG. 3. FIG. 3 illustrates a flow chart of a method 300 for executing one round of operations and determining the interface and voice for the voice response of the user to the first voice according to an embodiment of the present disclosure.

At block 310, in response to the voice response of the user 150 to the first voice, at least one of the first operation and an operation (hereinafter referred to as a second operation for convenience of description) associated with another function (hereinafter referred to as a second function for convenience of description) is performed, wherein the second operation is associated with the voice response. In some embodiments, the user 150 may make a voice response to the played first voice via the mobile device 120. The voice response may indicate the first operation associated with the first function indicated by the first interface, and may also indicate other operations associated with other functions. For example, when playing the voice "do you need to refuel?" on the mobile device 120, the user 150 may respond "I need to refuel" or may respond "I need to order a meal", and the like. Subsequently, the mobile device 120 may send the response to the server 130. The server 130 may realize speech recognition. In order to make a machine understand the meaning of text, semantics are usually used to represent the meaning of a natural language. Voice representation may be described by means of semantics+slot, wherein the semantics is a meaning expressed in this sentence, and the slot is a specific parameter needed to express this semantics. For example, a semantic meaning of this sentence "which is the most popular Japanese Cooking in Xujiahui?" is [search-ing restaurants], and a slot is [location=Xujiahui, type=Japanese Cooking, and feature=most popular]. The server 130 may recognize a voice response, and obtain a semantics of the voice response, thus executing an operation indicated in the semantics. For example, when playing the voice "do you need to refuel?" on the mobile device 120, and when the user 150 responds "I need to refuel", the server 130 can recognize that the semantics is [refueling] and execute an operation associated with "refueling", such as searching nearby gas stations, and the like. When the user 150 responds "I need to order a meal", the server 130 may recognize that the semantics is [ordering a meal], and execute an operation associated with "ordering a meal", such as such as searching nearby restaurants, and the like. When the user 150 responds "book Japanese Cooking for me, and then make an appointment for a designated driver after 10 o'clock in the night", the server may recognize that the semantics is [ordering a meal] and [designated driver], and execute operations associated with "ordering a meal" and "designated driver", such as searching nearby restaurants and searching designated drivers, and the like. It should be understood that the voice technology known in the art may be adopted to recognize and guide the voice, which will not be described in detail here.

In some embodiments, the server 130 may execute at least one of the first operation and the second operation via the third-party application server 140. As described above, the server 130 may provide an interface to interact with the third-party application server 140. Therefore, the server 130 can call the third-party application server 140 according to the operation type, so that the user 150 can enter the third-party application server 140 to execute a specific operation. For example, when the operation is buying or cancelling an "insurance", the server 130 may call an insurance-related application server, so that the user 150 can unlock and enter the corresponding application server to execute an insurance-related operation. In some embodiments, the server 130 may also make payments via the mobile device 120. When the user 150 needs to execute an operation of a function requiring payment, the server 130 may send an interface indicating the payment function and an associated voice to the mobile device 120. For example, when the user 150 needs to book a movie ticket, the server 130 may send an interface indicating the payment function and a voice "please pay" to the mobile device 120, so that the user 150 can complete the payment via the mobile device 120. In some embodiments, the server 130 may also perform navigation at the vehicle 110. The server 130 may automatically initiate navigation at the vehicle 110 based on an execution result. For example, after the user 150 selects a gas station from the interface with "list of nearby gas stations", the server 130 may initiate navigation at the vehicle 110, and a destination is the selected gas station. In this way, the embodiments of the present disclosure can establish a unified fund receiving and sending payment platform, which plays a good role in ensuring the safety of both an order taker at the server and an order dispatcher at the user end; and meanwhile, a location, a route and other information may be forwarded, which improving user experience.

In some embodiments, the server 130 may recognize the voice response to generate one or more keywords. The one or more keywords are associated with at least one of the first operation and the second operation. As mentioned above, semantics is usually used to represent the meaning of the natural language. The server 130 may obtain the semantics by recognizing the voice to generate the keywords. For example, when the voice response is "book the film Nezha over 20 o'clock", the server 130 may generate keywords "book", "20 o'clock" and "Nezha" to obtain a semantics [book the movie ticket], and the slot is [time=20, and name=Nezha]. Then, the server 130 may execute an operation indicated in the semantics. It should be understood that the recognition technology known in the art may be adopted to recognize the semantics, which will not be described in detail here.

At block 320, based on at least one of an execution result of the first operation (hereafter referred to as a first execution result for convenience of description) and an execution result of the second operation (hereafter referred to as a second execution result for convenience of description), an interface (hereinafter referred to as a second interface for convenience of description) and a voice (hereinafter referred to as a second voice for convenience of description) are determined, wherein the second interface is configured for indicating at least one of the first execution result and the second execution result, and the second voice indicates an operation (hereinafter referred to as a third operation for convenience of description) associated with at least one of the first execution result and the second execution result. As described above, after the operation associated with the response is executed, the server 130 determines the second interface and the second voice for indicating the execution result. For example, after executing the operation of searching the nearby gas stations, an interface with "list of nearby gas stations" and a voice "do you want to choose the first one?" are determined. After executing the operation of searching the nearby restaurants, an interface with "list of nearby restaurants" and a voice "do you want to choose the first one?" are determined, and the like.

In some embodiments, the voice response made by the user 150 to the played voice may include a plurality of keywords, that is, the second function may include a plurality of sub-functions, and the second operation includes a plurality of sub-operations associated with the plurality of sub-functions, the plurality of keywords is associated with the plurality of sub-operations, and the step of executing the second operation may include: based on semantic analysis, determining an execution order of the plurality of sub-operations associated with the plurality of keywords. As described above, the server 130 can recognize the keywords in the voice response, and the voice response may include a plurality of keywords to indicate the execution of the plurality of operations under the plurality of functions. For example, when the voice response is "book the film Nezha over 20 o'clock, and then make an appointment for a designated driver at 10 o'clock in the night", the server 130 may generate keywords "book", "20 o'clock", "Nezha" and "make an appointment for a designated driver". The server 130 can recognize that the current operation includes two sub-operations, "book a movie ticket" and "designated driver", and the server 130 can obtain a plurality of semantics based on the keywords, for example, the semantics of [booking a movie ticket] and the slot of [time=20, and name=Nezha], and the semantics of [designated driver], and the slot of [time=22]. The server 130 may, based on semantic analysis, recognize an execution order of the plurality of sub-operations associated with the plurality of keywords. For example, the server 130 can recognize that the movie ticket should be booked first and then the designated driver based on the time in the above two semantics. Then, the server 130 may execute the plurality of sub-operations based on the execution order. In some embodiments, the server 130 may determine, based on the execution results of the plurality of sub-operations, an interface and a voice, wherein the execution results of the plurality of sub-operations are indicated in the interface, and the voice sequentially indicates subsequent operations associated with the plurality of execution results. For example, still taking the voice response "book the film Nezha over 20 o'clock, and then make an appointment for a designated driver at 10 o'clock in the night" for example, the server 130 can determine interfaces of "successful booking" and "designated driver list", and play a voice "the booking is successful, do you want to choose the first designated driver?".".

At block 330, the server 130 may send the second interface and the second voice to the mobile device 120, thereby displaying the second interface on a display of the mobile device 120 while playing the second voice.

The method 300 may be repeatedly performed until the information services are completely provided. The user 150 may perform multiple rounds of voice interaction with the server 130 via the mobile device 120 until the task execution is completed or the consumption is finished, such as payment completion or navigation start, so as to provide all information services required by the user 150. In this way, the embodiments of the present disclosure can support multiple rounds of voice interaction and guidance of the user 150 with complex requirements, thereby realizing one-time interactive experience with multiple applications and multiple requirements.

In addition, the second interface includes an interface element associated with the execution result and an interface element associated with at least one of a current location of the vehicle 110 or a location that the vehicle needs to reach. In some embodiments, the second interface may include a first interface element and a second interface element. The first interface element is associated with at least one of the first execution result and the second execution result; and the second interface element is associated with at least one of the current location of the vehicle or the location that the vehicle needs to reach. For example, payment results, restaurant ordering results, selected gas stations, and the like, may be displayed on the second interface, and meanwhile, a map marked with the location where the vehicle 110 is located and/or a map marked with the location where the vehicle 110 needs to reach (e.g., ordered restaurant or selected gas station) are displayed.

In this way, the location or road can be forwarded while displaying the results of providing the information services, which significantly improves the vehicle management efficiency and the user experience.

Figure 4:
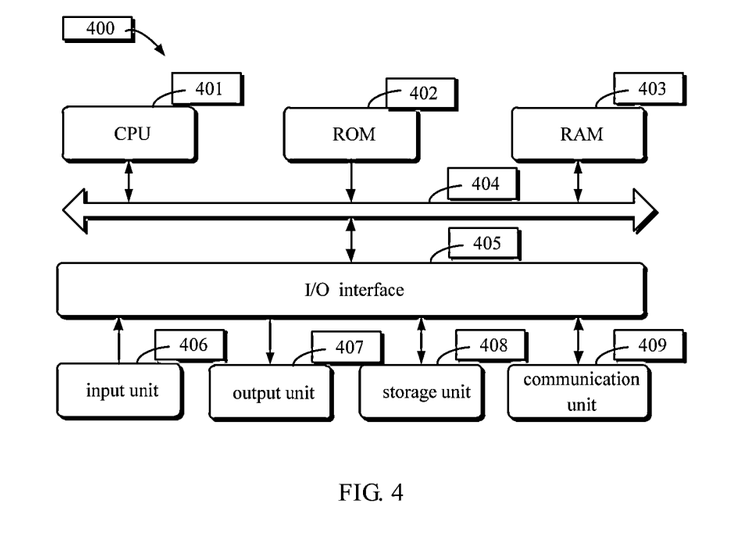
FIG. 4 illustrates a schematic block diagram of an electronic device 400 suitable for implementing the embodiments of the present disclosure.

FIG. 4 illustrates a schematic block diagram of an example device 400 that may be used to implement the embodiments of the present disclosure. For example, a server 130 as shown in FIG. 1 may be implemented by the device 400. As shown in the figure, the device 400 includes a central processing unit (CPU) 401, which can perform various appropriate actions and processes according to a computer program instruction stored in a read-only memory (ROM) 402 or loaded from a storage unit 480 into a random access memory (RAM) 403. In the RAM 403, various programs and data needed for operating the device 400 may also be stored. The CPU 401, the ROM 402, and the RAM 403 are connected to each other through a bus 404. An input/output (I/O) interface 405 is also connected to the bus 404.

A plurality of components in the device 400 are connected to the I/O interface 405, including: an input unit 406, such as a keyboard, a mouse, and the like; an output unit—407, such as various types of displays, speakers, and the like; a storage unit 408, such as a magnetic disk, an optical disk, and the like; and a communication unit 409, such as a network card, a modem, a wireless communication transceiver, and the like. The communication unit 409 allows the device 400 to exchange information/data with other devices through a computer network such as the Internet and/or various telecommunication networks.

The various processes and processing described above, such as the method 200 and/or the method 300 may be performed by the central processing unit 401. For example, in some embodiments, the method 200 and/or the method 300 may be implemented as a computer software program, which is tangibly embodied in a machine-readable medium, such as the storage unit 408. In some embodiments, a part or all of the computer program may be loaded and/or installed on the device 400 via the ROM 402 and/or the communication unit 409. When the computer program is loaded into the RAM 403 and executed by the CPU 401, one or more actions of the method 200 and/or the method 300 described above may be executed.

The present disclosure may be a method, an apparatus, a system and/or a computer program product. The computer program product may include a computer-readable storage medium carrying a computer-readable program instruction for performing various aspects of the present disclosure.

The computer-readable storage medium may be a tangible device that can hold and store an instruction used by an instruction executing device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (ROM) (EPROM or flash memory), a static random access memory (SRAM), a portable compact disc read-only memory (CD-ROM), a digital versatile disc (DVD), a memory stick, a floppy disc, a mechanical coding device, such as a punch card or a bulge structure in a groove on which an instruction is stored, or any suitable combination of the above. The computer-readable storage medium used here is not interpreted as instantaneous signals, such as radio waves or other freely propagated electromagnetic waves, electromagnetic waves propagated through waveguides or other transmission media (for example, light pulses through fiber optic cables), or electrical signals transmitted through electric wires.

The computer-readable storage medium used here may be downloaded from a computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives a computer-readable program instruction from the network and forwards the computer-readable program instruction for storage in the computer-readable storage medium in each computing/processing device.

The computer program instruction for executing operations of the present disclosure may be an assembly instruction, an Instruction Set Architecture (ISA) instruction, a machine instruction, a machine-related instruction, a micro-code, a firmware instruction, status setting data, or a source code or an object code written in one programming language or any combination of more programming languages. The programming languages include object-oriented programming languages such as Smalltalk, C++, and conventional procedural programming languages such as "C or similar programming languages. The computer-readable program instructions may be executed entirely on a user computer, partially executed on the user computer, executed as an independent software package, partially executed on the user computer and partially executed on a remote computer, or entirely executed on the remote computer or a server. In the case of involving in the remote computer, the remote computer can be connected to the user computer via any kind of network, including a local area network (LAN) or a wide area network (WAN), or can be connected to an external computer (e.g., connected via the Internet using an Internet service provider). In some embodiments, electronic circuits, such as a programmable logic circuit, a field programmable gate array (FPGA), or a programmable logic array (PLA), can be customized by utilizing the status information of the computer-readable program instruction. The electronic circuits can execute the computer-readable program instruction, thereby implementing various aspects of the present disclosure.

Various aspects of the present disclosure have been described with reference to the flow charts and/or block diagrams of the method, apparatus (system), and computer program products according to the embodiments of the present disclosure. It should be understood that each block of the flow chart and/or block diagram and combinations of the blocks in the flow chart and/or block diagram can be implemented by computer-readable program instructions.

These computer-readable program instructions may be provided to a general purpose computer, a special purpose computer, or a processing unit of other programmable data processing device to produce a machine for the instructions executed by the computer or the processing unit of other programmable data processing device to generate an apparatus for implementing the functions/actions specified in one or more blocks of the flow chart and/or block diagram. These computer-readable program instructions may also be stored in a computer-readable memory that can guide the computer, the programmable data processing device and/or other apparatus to work in a given manner, so that the computer-readable medium stored with instructions includes a product including an instruction that implements various aspects of the functions/actions specified in one or more blocks of the flow chart and/or block diagram.

These computer-readable program instructions may also be loaded to a computer, other programmable data processing device, or other apparatus, so that a series of operating steps are executed on the computer, the other programmable data, or the other apparatus to produce processing implemented by the computer, so that the instructions executed in the other programmable data, or the other apparatus implement the functions/actions specified in one or more blocks of the flow chart and/or block diagram.

The flow charts and block diagrams in the drawings show the possibly implemented architectures, functions, and operations of the system, the method, and the computer program product according to multiple embodiments of the present disclosure. In this regard, each block in the flow chart or block diagram may represent one module, one program segment, or a part of an instruction. The module, the program segment, or the part of an instruction contains one or more executable instructions for implementing specified logical functions. In some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flow charts, and combinations of the blocks in the block diagrams and/or flow charts, may be implemented with dedicated hardware-based systems that perform specified functions or actions, or may be implemented with combinations of dedicated hardware and computer instructions.

Various embodiments of the present disclosure have been described above, and the above description is exemplary, not exhaustive, and is not limited to the disclosed embodiments. Many modifications and variations will be apparent to those of ordinary skills in the art without departing from the scope and spirit of the illustrated embodiments. Terms used herein are selected to best explain the principles and practical applications of various embodiments or technical improvements to technologies in the market, or to enable other people of ordinary skills in the art to understand various embodiments disclosed herein.

The invention claimed is:

1. A method for providing an information service based on a usage scenario, comprising:
   determining a usage scenario of a user, by a server, in response to detecting that a mobile device associated with a vehicle is operated by a first action, wherein the usage scenario includes at least one of near field, exiting the vehicle, remote, and traveling;
   determining a first interface set associated with the usage scenario, based on the usage scenario of the user, wherein the first interface set comprises one or more first interfaces, wherein the first interface is configured for indicating a first function associated with the usage scenario, wherein the first interface supports a first operation associated with a first voice, wherein the first interface is the interface in a virtual key application which communicates with a vehicle control system remotely or in short range; and
   sending the first interface in the first interface set and the first voice associated with the sent first interface to the mobile device, to provide an information service to the user via the first interface and the first voice presented at the mobile device, wherein the information service is associated with vehicles, and includes services of inquiry, searching, booking, reservation, ordering or payment.

2. The method according to claim 1, wherein the method further comprises:
   in response to a voice response of the user to the first voice, executing at least one of the first operation and a second operation associated with a second function, wherein the second operation is associated with the voice response;
   determining a second interface and a second voice, based on at least one of a first execution result of the first operation and a second execution result of the second operation, wherein the second interface is configured for indicating at least one of the first execution result and the second execution result, wherein the second voice is configured for indicating a third operation associated with at least one of the first execution result and the second execution result; and
   sending the second interface and the second voice to the mobile device.

3. The method according to claim 2, wherein the step of executing at least one of the first operation and a second operation associated with a second function comprises:
   executing at least one of the first operation and the second operation, by a third-party application server;
   making a payment by the mobile device, wherein the first interface is an interface indicating a payment function, and the first voice is a voice associated with the payment function; and
   navigating at the vehicle.

4. The method according to claim 2, wherein the step of, in response to the voice response of the user to the first voice, executing at least one of the first operation and the second operation associated with the second function comprises:
   recognizing the voice response to generate one or more keywords, wherein the keywords are associated with at least one of the first operation and the second operation; and
   executing at least one of the first operation and the second operation.

5. The method according to claim 4, wherein the second function comprises a plurality of sub-functions, wherein the second operation comprises a plurality of sub-operations associated with the plurality of sub-functions, wherein the plurality of keywords is associated with the plurality of sub-operations, wherein the step of executing the second operation comprises:
   determining an execution order of the plurality of sub-operations associated with the plurality of keywords, based on semantic analysis; and
   executing the plurality of sub-operations, based on the execution order.

6. The method according to claim 2, wherein the second interface comprises:
   a first interface element, wherein the first interface element is associated with at least one of the first execution result and the second execution result; and
   a second interface element, wherein the second interface element is associated with at least one of a current location of the vehicle or a location that the vehicle needs to reach.

7. The method according to claim 1, further comprising:
   in response to information associated with the information service and received by the server, determining a third interface and a third voice associated with the third interface, wherein the third interface is configured for indicating a third function associated with the information service, and the third voice is configured for indicating a fourth operation associated with the third function.

8. The method according to claim 7, wherein the information associated with the information service comprises at least one of the following items:
   information associated with a status of the vehicle; and
   advertising information actively pushed by a third-party application server.

9. The method according to claim 1, wherein the step of determining a usage scenario of a user comprises:
   acquiring location information of the user, wherein the location information is detected via the mobile device; and
   determining the usage scenario of the user, at least based on the location information and a behavior habit of the user, wherein the behavior habit is determined at least based on historical behavior data of the user.

10. The method according to claim 1, wherein the step of sending the first interface and the first voice associated with the sent first interface to the mobile device comprises:
   determining a priority of the first interface in the first interface set, at least based on a behavior habit of the user, wherein the behavior habit is determined at least based on historical behavior data of the user; and
   sending a predetermined number of first interfaces in the first interface set and the first voice associated with the first interface to the mobile device, based on the priority.

11. A device for providing an information service based on a usage scenario, comprising:
   at least one processing unit; and
   a memory coupled with the at least one processor, wherein the memory contains an instruction stored therein, and the instruction, when executed by the at least one processor, causes the device to execute the operations comprising:
   determining a usage scenario of a user, by a server, in response to detecting that a mobile device associated with a vehicle is operated by a first action, wherein the usage scenario includes at least one of near field, exiting the vehicle, remote, and traveling;
   determining a first interface set associated with the usage scenario, based on the usage scenario of the user, wherein the first interface set comprises one or more first interfaces, wherein the first interface is configured for indicating a first function associated with the usage scenario, wherein the first interface supports a first operation associated with a first voice, wherein the first interface is the interface in a virtual key application which communicates with a vehicle control system remotely or in short range; and
   sending the first interface in the first interface set and the first voice associated with the sent first interface to the mobile device, to provide an information service to the user via the first interface and the first voice presented at the mobile device, wherein the information service is associated with vehicles, and includes services of inquiry, searching, booking, reservation, ordering or payment.

12. A nonvolatile computer-readable storage medium storing a computer program thereon, wherein the computer program, when executed by a machine, implements the method according to claim 1.

13. The device for providing an information service based on a usage scenario according to claim 11, wherein the operations further comprise:
   in response to a voice response of the user to the first voice, executing at least one of the first operation and a second operation associated with a second function, wherein the second operation is associated with the voice response;
   determining a second interface and a second voice, based on at least one of a first execution result of the first operation and a second execution result of the second operation, wherein the second interface is configured for indicating at least one of the first execution result and the second execution result, wherein the second voice is configured for indicating a third operation associated with at least one of the first execution result and the second execution result; and
   sending the second interface and the second voice to the mobile device.

14. The device according to claim 13, wherein the operation of executing at least one of the first operation and a second operation associated with a second function comprises:
   executing at least one of the first operation and the second operation, by a third-party application server;
   making a payment by the mobile device, wherein the first interface is an interface indicating a payment function, and the first voice is a voice associated with the payment function; and
   navigating at the vehicle.

15. The device according to claim 13, wherein the operation of, in response to the voice response of the user to the first voice, executing at least one of the first operation and the second operation associated with the second function comprises:
   recognizing the voice response to generate one or more keywords, wherein the keywords are associated with at least one of the first operation and the second operation; and
   executing at least one of the first operation and the second operation.

16. The device according to claim 13, wherein the second interface comprises:
   a first interface element, wherein the first interface element is associated with at least one of the first execution result and the second execution result; and
   a second interface element, wherein the second interface element is associated with at least one of a current location of the vehicle or a location that the vehicle needs to reach.

17. The device according to claim 11, wherein the operations further comprise:
   in response to information associated with the information service and received by the server, determining a third interface and a third voice associated with the third interface, wherein the third interface is configured for indicating a third function associated with the information service, and the third voice is configured for indicating a fourth operation associated with the third function.

18. The device according to claim 17, wherein the information associated with the information service comprises at least one of the following items:
   information associated with a status of the vehicle; and
   advertising information actively pushed by a third-party application server.

19. The device according to claim 11, wherein the operation of determining a usage scenario of a user comprises:
   acquiring location information of the user, wherein the location information is detected via the mobile device; and
   determining the usage scenario of the user, at least based on the location information and a behavior habit of the user, wherein the behavior habit is determined at least based on historical behavior data of the user.

20. The device according to claim 11, wherein the operation of sending the first interface and the first voice associated with the sent first interface to the mobile device comprises:
   determining a priority of the first interface in the first interface set, at least based on a behavior habit of the user, wherein the behavior habit is determined at least based on historical behavior data of the user; and sending a predetermined number of first interfaces in the first interface set and the first voice associated with the first interface to the mobile device, based on the priority.

* * * * *